Dec. 5, 1933.                 D. B. CLARK                 1,937,744
                           OIL TESTING APPARATUS
                Original Filed Dec. 20, 1926     2 Sheets-Sheet 1

Inventor
DAVID B. CLARK,
By Schley & Trask
Attorneys

Dec. 5, 1933.　　　　D. B. CLARK　　　　1,937,744
OIL TESTING APPARATUS
Original Filed Dec. 20, 1926　　2 Sheets-Sheet 2

INVENTOR
David B. Clark
BY
Warfield & Brown
ATTORNEYS

Patented Dec. 5, 1933

1,937,744

UNITED STATES PATENT OFFICE 1,937,744

OIL TESTING APPARATUS

David B. Clark, Lebanon, Ind., assignor to Goulds Pumps, Inc., Seneca Falls, N. Y., a corporation of New York Original application December 20, 1926, Serial No. 155,969. Divided and this application July 19, 1929. Serial No. 379,596

10 Claims. (Cl. 175—183)

This invention relates to oil-testing apparatus, and more specifically to apparatus for testing dielectric strength of oil.

It is an object of my invention to provide, desirably in association with an oil purifying apparatus, an automatic control means responsive to the dielectric strength of the oil and capable of controlling the operation of the purifying apparatus or the disposition of the oil discharged therefrom.

In a device embodying one form of the invention there is provided a closed chamber through which oil passes and which contains two spaced electrodes upon which a predetermined potential difference is maintained. These electrodes are conveniently connected across the secondary of the transformer in the primary circuit of which is a relay adapted to control the operation of the oil purifying apparatus.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

This application is a division of my co-pending application Serial No. 155,969, filed December 20, 1926. In that parent application, the oil tester is described in detail and claimed.

Figure 1:
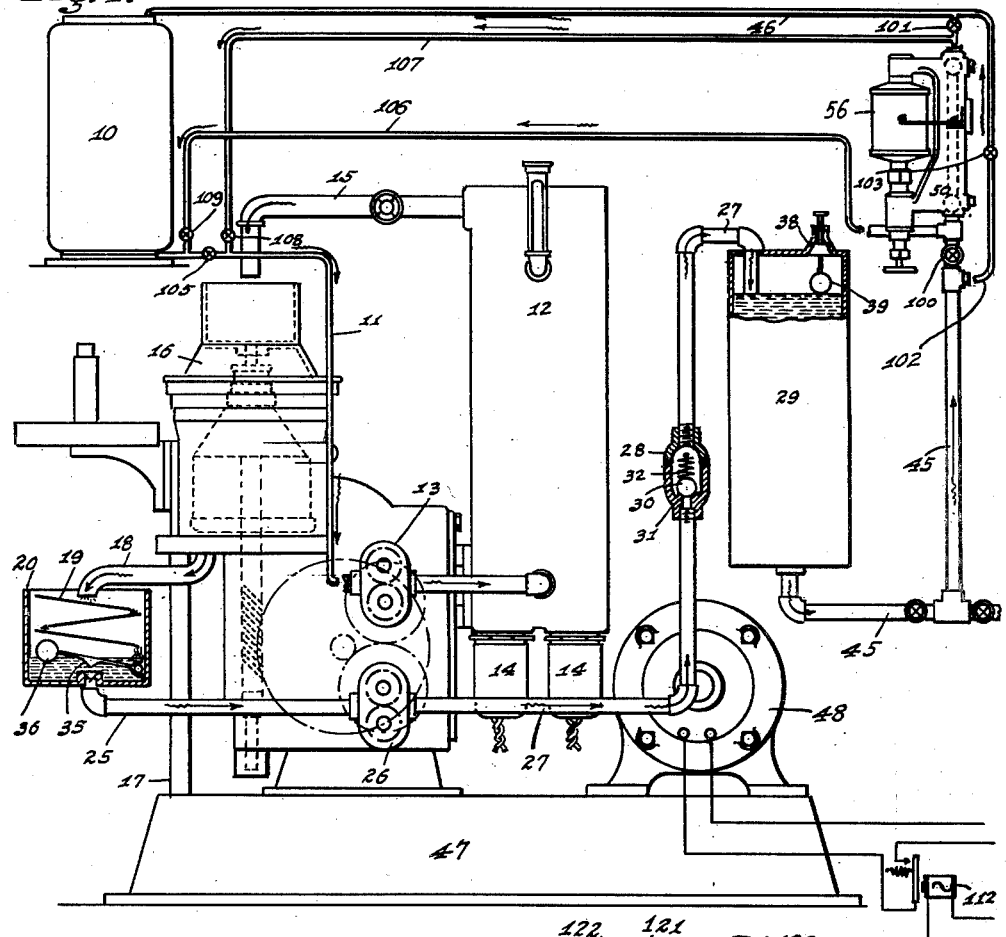
Figure 1 is an elevation of a purifying apparatus suitable for use in practicing my invention, and shows a testing device and its associated relay arranged to control the purifying device.

The purifying apparatus with which my invention is to be associated may take any desired form. In Fig. 1 of the drawings, the apparatus is shown as being incorporated in a closed circulating system including a transformer 10, the insulating oil of which is to be maintained at a predetermined dielectric strength.

In this apparatus, impure oil is caused to flow from the transformer 10 through a pipe 11 and into a tank 12 by means of any suitable pump 13. The tank 12 is adapted to be heated as by means of the electrical resistance heaters 14.

The hot oil leaving the tank 12 passes through a pipe 15 into a separator 16 which removes practically all the water previously contained in the oil, the water leaving through a waste pipe 17 and the oil being conducted through a pipe 18 over a series of baffle plates 19 into a tank 20. Oil is withdrawn from the tank 20 through a pipe 25, and by means of a pump 26 is forced through a pipe 27, past a check valve 28, and into a separating tank 29. The check valve may comprise a valve member 30 spring-pressed against a valve seat 31 by means of a spring 32, the spring 32 desirably being of sufficient strength to maintain a considerable pressure in the pipe 27.

To prevent complete exhaustion of oil from the tank 20 and consequent drawing of air into the pipes 25 and 27, I may provide the tank 20 with a valve 35 controlled by a float 36 in such a manner that the valve will be closed before the oil level in the tank 20 drops below the opening in the pipe 25.

The tank 29, into which the pipe 27 discharges, is provided with an air vent controlled by a valve 38 which is operatively connected to a float 39 and arranged to be closed by such float when the oil in the tank 29 reaches a predetermined level. This prevents the escape of any oil through the air vent opening.

The various parts of the purifying apparatus may be mounted on a common base 47 which may also serve as a support for an electric motor 48 that drives the separator 15 and the pumps 13 and 26.

From the tank 29 oil is conducted through pipes 45 and 46 to the transformer 10. In the pipe 45 I locate the oil-testing device which is adapted to control the operation of the oil-purifying apparatus.

In the operation of the oil-purifying apparatus, oil is withdrawn from the transformer 10 and forced through the heating tank 12 into the separator 16 in which substantially all the water is removed. As the oil passes over the baffle plates 19, after the removal of water, a large part of any included air is permitted to escape.

During its passage from the tank 20 to the tank 29 the oil is subjected to considerable pressure by reason of the presence in the pipe 27 of the check valve 28. This increases the pressure to which the oil is subjected causing such air as was not removed during the passage of oil over the baffle plates 19 to form in relatively large bubbles which escape from the oil in the tank 29. The air which separates from the oil in the tank 29 passes through the air vent opening until the oil level in the tank has risen sufficiently to cause the float 29 to close the valve 38. Thereafter, as more oil is forced into the tank 29, the pressure in the tank 29 increases and oil is discharged through the pipe 45 through the oil tester to the pipe 46 and thence back to the transformer.

If desired, the use of a supplementary system of piping and valves enables the oil to be passed over different courses. To this end, I may mount in the pipe 45 two valves 100 and 101 between which the tester is located. Around these valves there extends a bypass pipe 102, which is connected to the pipe 45 below the valve 100 and extends through a valve 103 to the pipe 46. It will be apparent that by suitable manipulation of the valves 101 and 103 oil can be discharged either through the tester or around it. The pipe 11 may be provided with a valve 105 from opposite sides of which there extend pipes 106 and 107 leading to the pipe 45, the pipe 106 being connected to the pipe 45 between the tester and the valve 100, and the pipe 107 being connected to the pipe 45 between the tester and the valve 101. Valves 109 and 108 located respectively in the pipes 106 and 107 control flow therethrough.

By closing the valves 100, 101, and 105 and by opening the valves 103, 108, 109, it is possible to cause the oil to pass from the transformer 10 through the tester, and then through the purifying apparatus back to the transformer. By this means, the tester can be made to indicate the condition of all the oil in the transformer, and may control the purifying apparatus accordingly.

Figure 2:
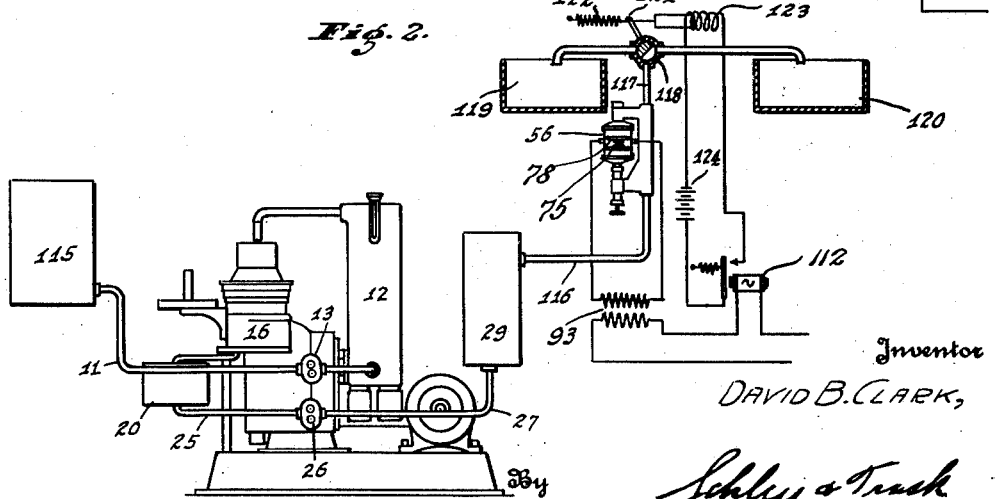
Fig. 2 is a somewhat diagrammatic illustration of the purifying apparatus with an oil tester arranged to control the disposition of the oil after its purification.

As stated above, details of the oil tester are described in my co-pending application Serial No. 155,969. For the present, it is only necessary to consider that the tester comprises a chamber 56 through which oil passes and in which are located two electrodes 75 and 78. These electrodes are located at predetermined distances apart and are connected across the secondary of a transformer 93. The primary of the transformer 93, as shown in Fig. 2, is connected in series with an alternating current relay 112 which may be used in various ways to control the operation of the oil-purifying apparatus.

Figure 3:
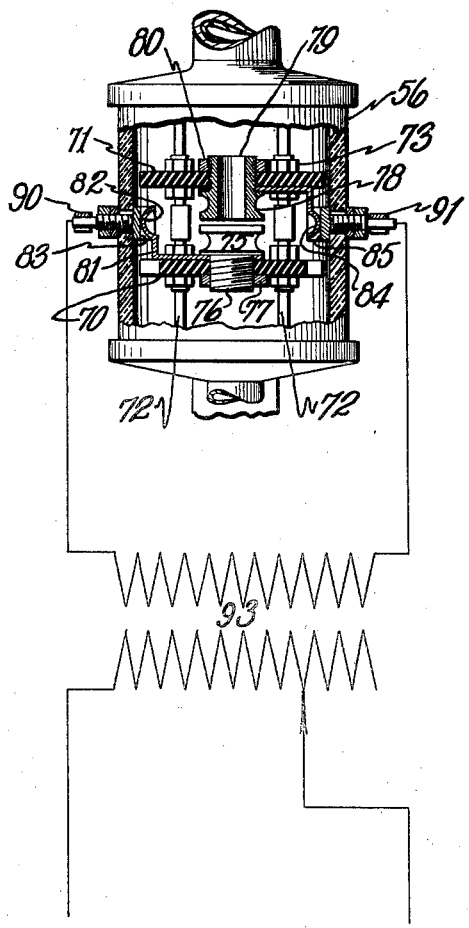
Fig. 3 is a sectional view in elevation of a detail of the device shown in Fig. 1.

The tester is shown in more detail in Fig. 3. It may be supported in any convenient manner as by the two insulating plates 70 and 71, which are in turn supported in spaced relation on legs 72 by means of nuts 73. The electrode 75 may take the form of a plug associated with plate 70 and may be provided with a screw-threaded stem 76, which extends through the plate 70 and which is provided with a nut 77 by means of which it may be secured to the plate. The electrode 78 may likewise take the form of a plug having a threaded stem 79, and a nut 80, and may be mounted on the plate 71 in registry with the electrode 75. The adjacent faces of the electrodes may be plane and parallel. Means may be provided so that oil in passing through the cylinder 56, may passs between the two electrodes and up through said axial hole. For example, one of the electrodes here shown as 78 may be provided with an axial hole.

Electrical potential may be supplied to the electrodes in any desired manner. In electrical contact with the head of the plug 75 and conveniently located between the head of such plug and to plate 70 there may be a strip of metal 81 which may extend outward and at its end may be bent to form a contact finger 82 adapted to engage a contact 83 mounted in the wall of the cylinder 56. A similar contact finger 84 may serve to connect the plug 78 with a second contact 85 also mounted in the wall of the cylinder 56 and conveniently located diametrically opposite to the contact 83. The contacts 83 and 84 may be conveniently provided with screw-threaded shanks which may extend through the wall of the cylinder 56 and on the outside thereof may be provided with washers and nuts for the purpose of holding the contacts in place.

In electrical contact with the shanks of the contacts 83 and 84 are two contact fingers 90 and 91, respectively, which may be conveniently supported from a strip 92 of insulating material mounted on the frame 50. The fingers 90 and 91 may be connected to the secondary of a transformer 93.

The electrodes 75 and 78 of the oil tester are so spaced and the potential difference imposed upon them is so selected that no spark will pass between the electrodes when the oil passing through the tester is at or above the desired dielectric strength. When no spark passes between the electrodes, the primary of the transformer 93 acts as a choke coil, and the relay 112 is de-energized. If the oil in the chamber 56 is of less than the desired dielectric strength, a spark will pass between the electrodes, the impedance of the transformer 93 will be decreased, and the relay 112 energized.

When the tester is connected in such a manner that it receives oil from the purifying apparatus, I prefer to arrange the relay 112 in the manner illustrated in Fig. 1, where it serves to interrupt the supply of current to the motor 48 and to stop the purifying apparatus when the oil layer between the electrodes 75 and 78 breaks down. The control means for the relay 112 shown in Fig. 1 is the same as the control means for the relay 112 shown in Fig. 2. The stopping of the purifying apparatus indicates that some part of it is failing to function, and the necessary repairs or adjustments can then be made. When the oil tester is connected to receive oil from the transformer 10, it may be desirable to arrange the relay 112 in such a manner that it will maintain the supply of current to the motor 48 as long as the oil between the electrodes 75 and 78 is breaking down. When all the oil in the circulating system has been purified to the desired extent, the passage of a spark between the electrodes 75 and 78 will be prevented, the relay 112 will be deenergized, and the supply of current to the motor 48 interrupted.

In Fig. 2 I have illustrated an arrangement in which the oil tester, instead of controlling the oil-purifying apparatus itself controls the disposition of oil discharged from such apparatus. In this arrangement, untreated oil is drawn from a supply tank 115 and is passed through the purifying apparatus as before to the tank 29 from which it escapes through a pipe 116. The inlet of the oil tester is connected to the pipe 116 and the outlet through a pipe 117 to the middle port of a three-way valve 118. The other two ports of the valve 118 are connected to pipes leading respectively to tanks 119 and 120.

The position of the valve 118 is controlled through an arm 121 which is spring-pressed in one direction by a spring 122 and is adapted to be moved in the other direction by means of a solenoid 123. The winding of the solenoid 123 is connected to a current-source 124 through the contacts of an alternating current relay 125, the winding of which is in series with the primary of the transformer 93.

When the oil passing through the tester is of the desired dielectric strength, the passage of a spark between the electrodes of the tester is prevented, and the relay 125 is de-energized. As a result, no current is supplied to the solenoid 123 and the spring 122 holds the valve-operating arm to the left to direct oil into the tank 120. When the oil film between the electrodes breaks down, however, the relay 125 is energized to close the circuit of the solenoid 123. Thereupon, the solenoid operates to move the valve-operating arm 121 to the right, thus causing the oil to be discharged into the tank 119. So long as oil of insufficient dielectric strength continues to pass through the tester, the solenoid 123 remains energized, and such impure oil is discharged into the tank 119. When pure oil again passes through the tester, the solenoid 123 is de-energized, and the spring 122 operates to adjust the valve 118 so that such oil will be discharged into the tank 120.

I claim as my invention:—

1. In combination, a device for testing the dielectric strength of oil, means for conducting oil to and from said testing device, a tank for receiving oil discharged from said testing device, and means automatically operative to stop the flow of oil to said tank when any oil of less than a predetermined dielectric strength passes through said testing device.

2. In combination, a device for testing the dielectric strength of oil, means for conducting oil to and from said testing device, two tanks for receiving oil, oil distributing means controlled by said testing device for directing oil discharged from said testing device to one tank or the other depending on whether such oil is above or below a predetermined dielectric strength.

3. In a pipe system for conveying oil, a device located in said pipe system for testing the dielectric strength of oil passing through the system, and means controlled by said device for controlling oil-flow through the pipe system.

4. In a pipe system for conveying oil, a device located in said pipe system for testing the dielectric strength of oil passing through said system and means controlled by said device for controlling the oil flow through said system, said device providing a chamber through which oil flowing through said system may pass, and including two electrodes located in said chamber and spaced a predetermined distance apart, and a transformer, the secondary circuit of which includes said electrodes, and the primary of which includes an alternating-current relay.

5. In combination, a device for testing the dielectric strength of oil, a pump for forcing oil to and through said testing device, a tank for receiving oil discharged from said testing device, and means automatically operative to stop the flow of oil to said tank when any oil of less than a predetermined dielectric strength passes through said testing device.

6. In combination, a device for testing the dielectric strength of oil, a pump for forcing oil to and through said testing device, and means automatically operative to stop said pump when any oil of less than a predetermined dielectric strength passes through said testing device.

7. An apparatus for determining the conductivity of a flowing body and for selectively distributing the flow of said body to predetermined locations determined by the conductivity thereof, comprising spaced electrodes exposed to said flowing body, a plurality of outlets for said flowing body, a balanced valve for normally maintaining certain of said outlets in open position while maintaining the remainder of said outlets in closed position, means for maintaining a high potential difference between said electrodes and means responsive to the flow of current between said electrodes for operating said balanced valve to selectively distribute the flow of said body to one of said outlets while allowing a continuous flow of said body past said electrodes.

8. An apparatus for determining the composition of a flowing fluid body and for selectively distributing the flow of said body to predetermined locations determined by the conductivity thereof, comprising a channel, spaced electrodes disposed in said channel and exposed to said flowing body, a plurality of outlets for said flowing body from said channel, a balanced valve for maintaining certain of said outlets in open position while maintaining the remainder of said outlets in closed position, means for maintaining a high potential difference between said electrodes, means responsive to the flow of the current between said electrodes to indicate the conductivity of said flowing body, and additional means responsive to the flow of said current for operating said balanced valve to cause the same to selectively distribute the flow of said body to certain of said outlets dependent upon the conductivity of said body.

9. In combination, an oil testing device having a casing, two electrodes located in said casing in spaced relation relative to each other, said electrodes being arranged so that at least part of any oil passing through said casing will pass between said electrodes, means for imposing a predetermined potential difference on said electrodes; means for conducting oil to and from said testing device, a tank for receiving oil discharged from said testing device, and means operative to stop the flow of oil to said tank when the oil between the electrodes of said testing device breaks down.

10. In combination, an oil testing device having a casing, two electrodes located in said casing in spaced relation relative to each other, said electrodes being arranged so that at least part of any oil passing through said casing will pass between said electrodes, means for imposing a predetermined potential difference on said electrodes; means for conducting oil to and from said testing device, two tanks for receiving oil, and oil-distributing means controlled by said testing device for directing oil discharged from said testing device to one tank or the other depending on whether or not oil passing between the electrodes of said testing device breaks down.

DAVID B. CLARK.